United States Patent
Smyth et al.

(10) Patent No.: US 12,132,262 B2
(45) Date of Patent: *Oct. 29, 2024

(54) MACHINE LEARNING-BASED ANTENNA ARRAY VALIDATION, PROTOTYPING AND OPTIMIZATION

(71) Applicant: Cypress Semiconductor Corporation, San Jose, CA (US)

(72) Inventors: Aidan Smyth, Meath (IN); Kiran Uln, Pleasanton, CA (US); Victor Simileysky, San Jose, CA (US); Zhuohui Zhang, Tustin, CA (US)

(73) Assignee: Cypress Semiconductor Corporation, San Jose, CA (US)

(*) Notice: Subject to any disclaimer, the term of this patent is extended or adjusted under 35 U.S.C. 154(b) by 325 days.

This patent is subject to a terminal disclaimer.

(21) Appl. No.: 17/716,888

(22) Filed: Apr. 8, 2022

(65) Prior Publication Data

US 2022/0294126 A1    Sep. 15, 2022

Related U.S. Application Data

(63) Continuation of application No. 16/584,383, filed on Sep. 26, 2019, now Pat. No. 11,303,041.

(Continued)

(51) Int. Cl.
*H04B 7/02* (2018.01)
*H01Q 3/26* (2006.01)
(Continued)

(52) U.S. Cl.
CPC ........... *H01Q 21/24* (2013.01); *H01Q 3/2605* (2013.01); *H04L 27/362* (2013.01)

(58) Field of Classification Search
CPC .... H01Q 21/24; H01Q 3/2605; H04L 27/362; G06N 3/08; H04B 17/27; H04B 7/0617; H04B 17/391; H04B 7/02; H04W 24/02
See application file for complete search history.

(56) References Cited

U.S. PATENT DOCUMENTS 10,371,797 B1 * 8/2019 Prados .................... G01S 13/86
11,303,041 B2 * 4/2022 Smyth ................. H04B 7/0617
(Continued)

FOREIGN PATENT DOCUMENTS

CN    108416290 A    8/2018
CN    108828505 A    11/2018
(Continued)

OTHER PUBLICATIONS

Japanese Office Action from Application 2022-504169 dated Jun. 25, 2024; 4 pages.

(Continued)

*Primary Examiner* — Andrew Wendell (57) ABSTRACT

An example method of estimating the angular resolution of antenna array comprises: receiving a plurality of values of magnitude and phase of a radio frequency (RF) signal for each antenna element of a plurality of antenna elements comprised by an antenna array; performing, by a machine learning model, a feature extraction operation to transform the plurality of values of magnitude and phase into a plurality of data points in a reduced-dimension space; clustering, by the machine learning model, the plurality of data points into a plurality of clusters; and computing, based on the clustered data points, an angular resolution value for the antenna array.

20 Claims, 9 Drawing Sheets

Related U.S. Application Data (60) Provisional application No. 62/878,232, filed on Jul. 24, 2019.

(51) Int. Cl.
  *H01Q 21/24* (2006.01)
  *H04L 27/36* (2006.01)

(56) References Cited

U.S. PATENT DOCUMENTS

| | | | |
|---|---|---|---|
| 2010/0109938 A1 | 5/2010 | Oswald et al. | |
| 2017/0222332 A1* | 8/2017 | Bialer | H01Q 1/125 |
| 2017/0256855 A1* | 9/2017 | Robinson | H01Q 3/34 |

FOREIGN PATENT DOCUMENTS

| | | |
|---|---|---|
| CN | 109991591 A | 7/2019 |
| CN | 109997057 A | 7/2019 |
| JP | 2006236132 A | 9/2006 |
| JP | 2016075558 A | 5/2016 |

OTHER PUBLICATIONS

Chinese Patent Office from Application 202080053448.3 dated Aug. 1, 2024; 18 pages.

* cited by examiner

MACHINE LEARNING-BASED ANTENNA ARRAY VALIDATION, PROTOTYPING AND OPTIMIZATION

RELATED APPLICATIONS

This application is a continuation of U.S. patent application Ser. Number 16/584,383, filed on Sep. 26, 2019, which claims the benefit of U.S. Provisional Application No. 62/878,232, filed Jul. 24, 2019, all of which are incorporated herein in their entirety.

BACKGROUND

An antenna array may include a plurality of antenna elements having certain geometrical shapes and sizes. In practice, antenna design parameters may include the number, types, and geometric properties (e.g., shape, size, area) of antenna elements, as well as the size of spaces between the antenna elements.

BRIEF DESCRIPTION OF THE DRAWINGS

The present disclosure is illustrated by way of example, and not of limitation, in the figures of the accompanying drawings in which.

DETAILED DESCRIPTION

The embodiments described herein are directed to systems and methods for employing machine learning models for antenna array validation, prototyping, and optimization.

Antenna design parameters may include the number, types, and geometric properties (e.g., shape, size, area) of antenna elements, as well as the size of spaces between the antenna elements. Accordingly, in one example, the design goal of an antenna may involve optimizing certain operational characteristics of the antenna, such as the resolution of the angle-of-arrival estimation (also referred to herein as angular resolution), while satisfying the physical design constraints, which may be specified by the ranges or maximum values of certain antenna design parameters (e.g., the number, types, and geometric properties of antenna elements, and/or spaces between the antenna elements). In another example, the design goal of an antenna may involve optimizing certain physical design parameters (e.g., the number, types, and geometric properties of antenna elements, and/or spaces between the antenna elements) while satisfying the operational constraints (such as providing at least the desired angular resolution). Additional constraints may be applied to the design process itself, e.g., reducing the number of physical prototypes and physical experiments involved in the design process.

Figure 1:
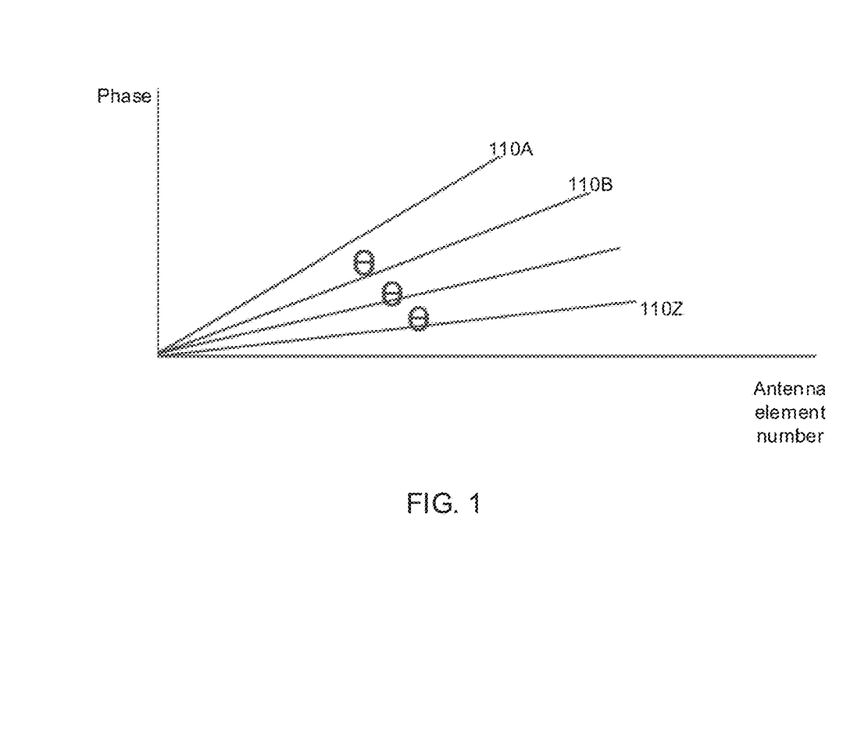
FIG. 1 illustrates the phase response of an ideal antenna in the spatial domain.

Unlike various common implementations, which analyze the antenna gain distribution over the spatial and/or frequency domains, the systems and methods of the present disclosure analyze the phase response of a multi-element antenna in order to estimate its angular resolution. FIG. 1 illustrates the phase response of an ideal antenna in the spatial domain (the X axis corresponds to the number of antenna elements, while the Y axis corresponds to the phase of the received RF signal). Each plot 110A-110Z corresponds to a certain value of the angle-of-arrival (AoA) of the received RF signal (denoted Θ in FIG. 1).

Figure 2:
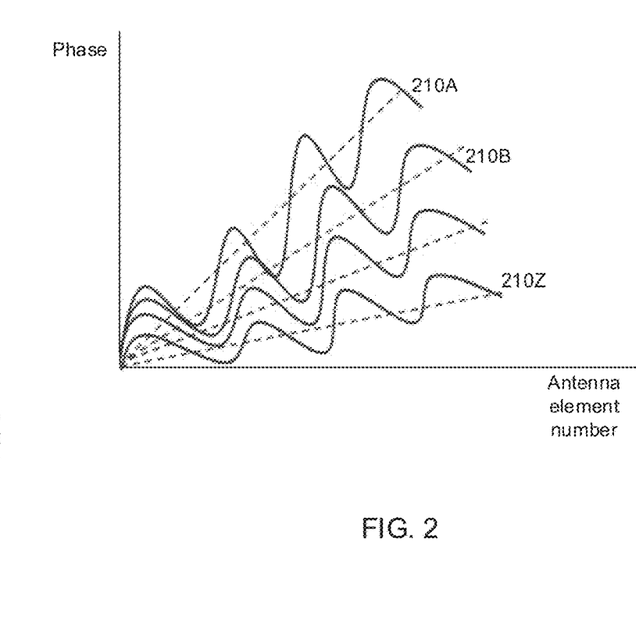
FIG. 2 illustrates the phase response of an example area-optimized antenna array.

As seen from FIG. 1, the angular resolution of the antenna exhibiting the depicted linear phase responses would only depend on the spatial domain characteristics (i.e., the number of antenna elements). However, the antenna design requirements may limit the physical size of the antenna, e.g., for mobile or wearable devices. Accordingly, the phase response of an example area-optimized antenna may become significantly non-linear, as shown by plots 210A-210Z of FIG. 2.

The task of estimating the angular resolution of an antenna array exhibiting substantially non-linear phase responses may be very challenging at least for its computational complexity. Accordingly, the systems and methods described herein rely upon machine learning techniques in order to build and train efficient models for estimating the angular resolution of antenna arrays.

The raw data utilized for estimating the angular resolution may include a plurality of RF signal magnitude and phase values measured by multiple antenna elements at one or more RF channels. Thus, each input data point is represented by a vector in a hyperspace of 2*N dimensions, where N is the number of antenna elements and the dimensions represent the magnitude and phase values measured by each antenna element. In some implementations, the RF signal magnitude and phase values may be produced by an antenna simulation model based on the specified antenna design parameters.

The systems and methods of the present disclosure employ a machine learning model, which performs feature extraction in order to reduce the dimensionality of the input data and then performs clustering of the extracted features in the reduced-dimension space in order to estimate the angular resolution of a prototype antenna array. Once the angular resolution of the prototype antenna array is determined, the system may formulate the design optimization feedback for improving sub-optimal sections of the antenna array response, as described in more detail herein below.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

Figure 3:
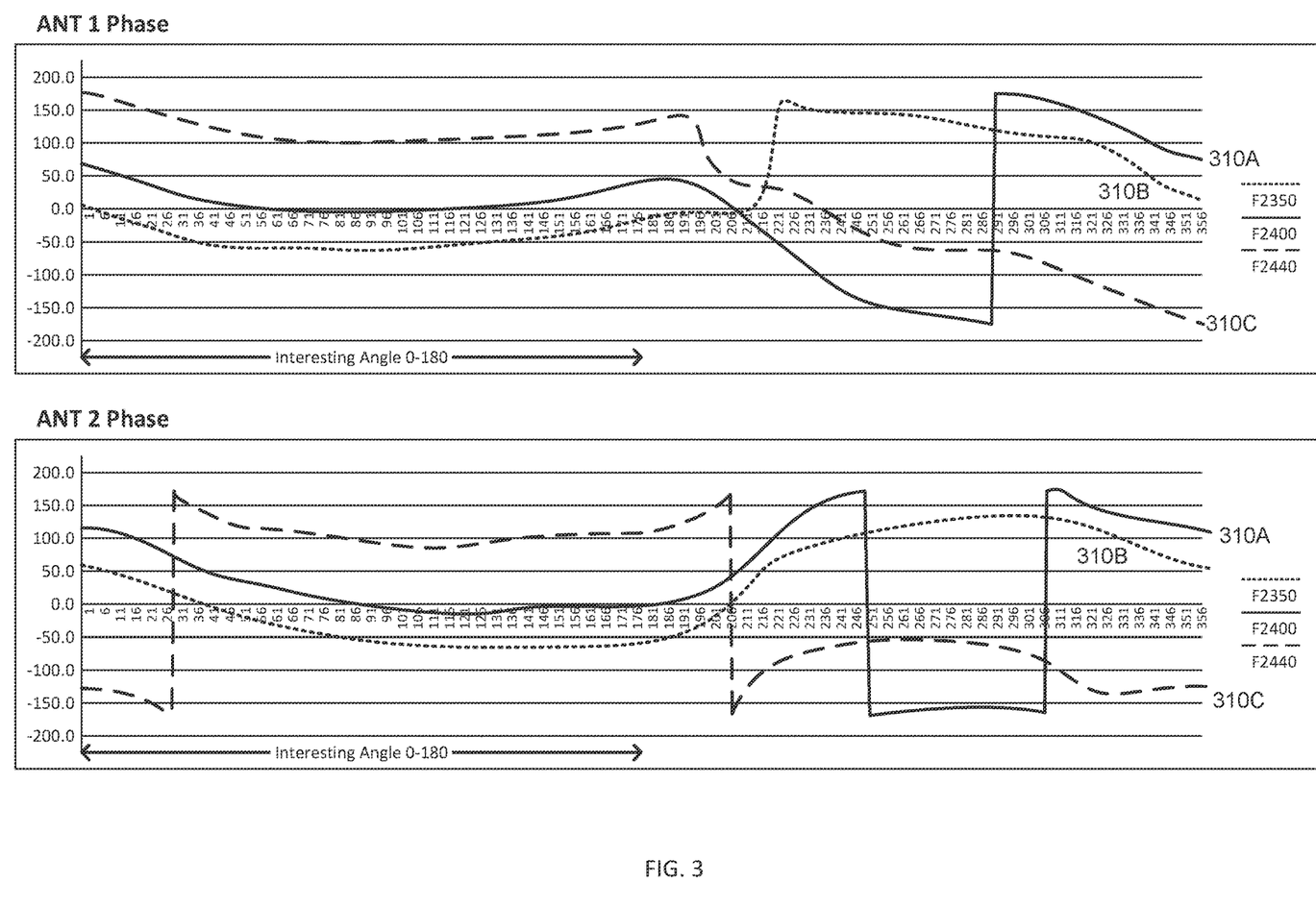
FIG. 3 depicts illustrates the dependency of the radio frequency (RF) signal phase of the angle-of-arrival measured by the first and the second elements of an example antenna array.

As noted herein above, the systems and methods of the present disclosure analyze the phase response of a multi-element antenna in order to estimate its angular resolution. FIG. 3 depicts the plots 310A-320N and 320A-320N of the RF signal phase measured by the first and the second elements of an example antenna array, respectively (the X axis corresponds to the AoA of the received RF signal, while the Y axis corresponds to the phase of the received RF signal). Each of the plots 310A-310N and 320A-320N corresponds to a certain RF channel. As seen from FIG. 3, at some values of the AoA, the phase responses may not be sufficiently distinguishable in order to provide the requisite angular resolution.

Since the phase responses of the antenna are substantially non-linear, the computational complexity of the straightforward analysis of the phase responses would grow exponentially with the number of antenna array elements. Accordingly, a machine learning model may be employed for perform feature extraction in order to reduce the dimensionality of the input data, thus significantly reducing the computational complexity of the task to be solved.

Figure 4:
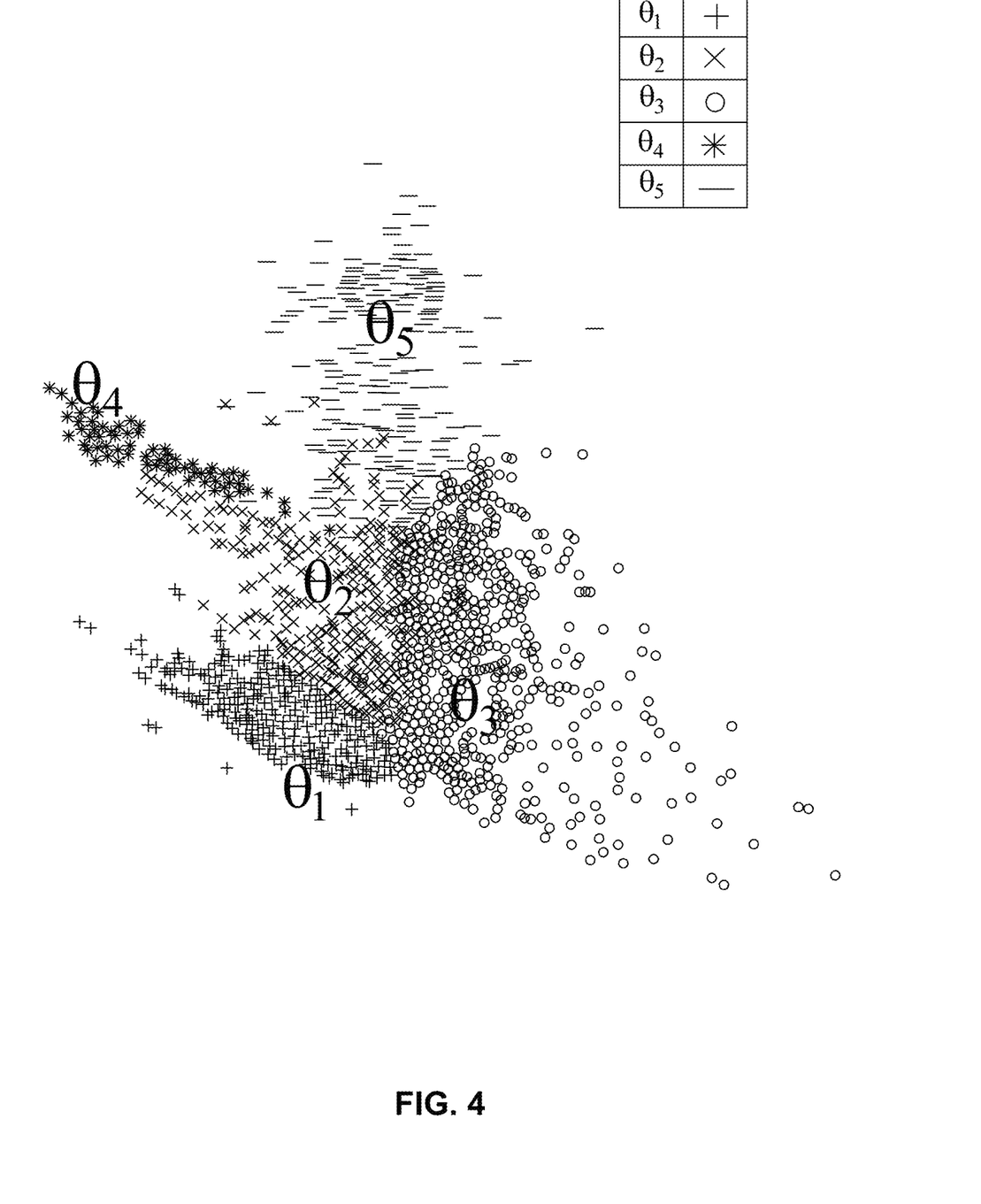
FIG. 4 illustrates a two-dimensional projection of a set of multi-dimensional data points representing the input RF signal measurements.

The machine learning model may then utilize the extracted features (i.e., representation of the input data in the reduced-dimension space) for clustering the data points representing the phase responses into multiple clusters, such that each cluster would correspond to a certain value of the AoA. As schematically illustrated by FIG. 4, which depicts a two-dimensional projection of a set of multi-dimensional data points representing the input data, the data points are grouped into multiple overlapping clusters, such that each cluster corresponds to a certain value of the AoA of the received RF signal (denoted $\Theta_1$-$\Theta_5$ in FIG. 4).

In some implementations, the model employed for performing the feature extraction and clustering may be implemented by a neural network, such as a convolutional neural network (CNN) or a recurrent neural network (RNN). A neural network is a computational model that implements a multitude of connected nodes called "artificial neurons," such that each artificial neuron processes one or more input signals (including a bias signal) and transmits the output signal to one or more neighboring artificial neurons. The output of an artificial neuron may be computed by applying its activation function to a linear combination of its inputs. A neural network may be trained by processing examples ("training data sets") to perform feature extraction, regression and/or classification tasks, generally without being programmed with any task-specific rules, as described in more detail herein below.

Figure 5:
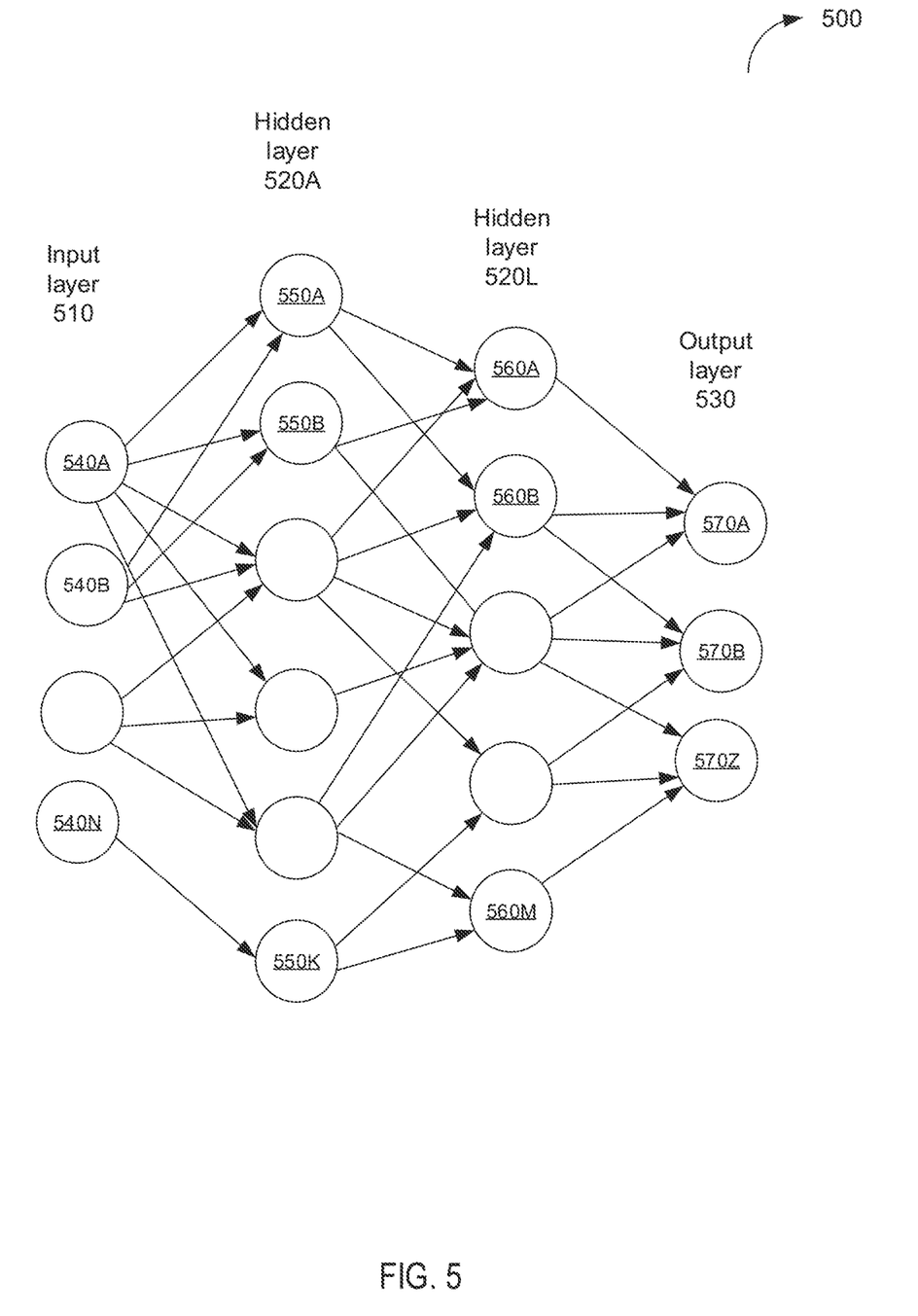
FIG. 5 schematically illustrates a structure of an example neural network.

As schematically illustrated by FIG. 5, the neural network employed by the systems and methods of the present disclosure may be represented by a multilayer perceptron (MLP) 500, the artificial neurons of which are grouped into several layers, including the input layer 510, one or more hidden layers 520A-520L, and the output layer 530. The input layer 510 includes one or more neurons 540A-540N, which are connected to one or more neurons 550A-550K of the first hidden layer 520A. The first hidden layer neurons 550A-550K are, in turn, connected to one or more neurons 560A-560M of the second hidden layer 520L. The second hidden layer neurons 560A-560M are, in turn, connected to one or more neurons 570A-570Z of the output layer 530. At least some of the nodes of the artificial neural network 500 may utilize nonlinear activation functions, while the remaining nodes (e.g., the nodes of the output layer) may utilize linear activation functions. While FIG. 5 schematically illustrates a single hidden layer 550, in various implementations of the systems and methods of the present disclosure the number of hidden layers may vary. In some embodiments, the number of hidden layers is a hyperparameter of the model, i.e., a parameter, the value of which is specified before the training process. Other hyperparameters of the model may include the numbers of nodes in each layer, the activation function types, etc.

Each edge in FIG. 5 denotes a connection for transmitting a signal from one artificial neuron to another, in a manner similar to operation of the synapses in the human brain. Edge weights, which increase or attenuate the signals being transmitted through respective connections, are defined at the network training stage based on a training dataset that includes a plurality of labeled inputs (i.e., inputs with known classification).

The neural network training procedure may start with initializing all edge weights and neuron bias values to random or predetermined values. The systems and methods of the present disclosure utilize unsupervised training procedures for training the neural network performing the feature extraction and clustering tasks. Unlike supervised training, which requires a training data set labeled with the known output values, unsupervised training utilizes unlabeled training data sets.

In some implementations, a clustering technique (such as k-means clustering) is used to assign the samples in the training set data to one of k clusters, in such a way that the mean distance between the samples and the cluster centroid is minimized. Upon completing a clustering iteration, a predetermined quality metric (e.g., the cluster density) is computed and compared with the desired value, and the error is propagated back to the previous layers of the neural network, in which the weights and bias values are adjusted in order to minimize the predetermined loss function (e.g., the difference between the observed and desired cluster densities). This process may be repeated until the quality metric would satisfy a predetermined condition (e.g., fall below a predetermined threshold or exceed a predetermined threshold). In various other implementations, other clustering techniques may be employed.

In some implementations, the feature extraction, clustering, and regression operations may be performed by the same neural network, in which a first subset of layer layers perform the feature extraction, the second subset of layers perform the clustering, while the remaining layers perform the regression task. In other implementations, multiple separately trained neural networks may be employed for performing each of the feature extraction, clustering, and regression tasks.

Referring again to FIG. 4, the machine learning model may utilize the extracted features (i.e., representation of the input data in the reduced-dimension space) for clustering the data points representing the phase responses into multiple clusters, such that each cluster would correspond to a certain value of the AoA. Thus, the angular resolution of the antenna array may be visualized by the extent of the cluster overlapping: relatively small or no overlap would indicate that the AoA values of the points belonging to neighboring clusters are distinguishable, and the angular resolution is at least the difference between the AoA values of the cluster centroids, while significant overlap would indicate that the angular resolution cannot be accurately estimated based on the available input data. Thus, the angular resolution of the antenna array may be inferred from the observed RF signal parameter values by a neural network performing a regression task.

Supervised training of the neural network involves sequentially processing the labeled data items of the training dataset (i.e., a plurality of vectors of RF signal power levels, such that each vector, which includes RF signal magnitude and phase values measured by multiple antenna elements at a given frequency channel, is labeled with the corresponding AoA value, and a group of vectors is labeled with a corresponding angular resolution value). The observed output of the neural network is compared with the desired output specified by the label associated with the vector being processed, and the error is propagated back to the previous layers of the neural network, in which the weights and bias values are adjusted accordingly. This process may be repeated until the output error would fall below a predetermined threshold.

Thus, a machine learning model may receive the input data comprising a plurality of RF signal magnitude and phase values (measured by multiple antenna elements at one or more RF channels or produced by an antenna simulation model based on the specified antenna design parameters), perform feature extraction in order to reduce the dimensionality of the input data, and perform clustering of the extracted feature values in order to estimate the angular resolution of the antenna array. While the examples described herein reference neural networks, other machine learning techniques may be employed by the systems or methods of the present disclosure.

The machine learning models described herein may be employed for automatic antenna design workflows, by estimating angular resolution of a prototype antenna array, identifying sub-optimal sections of the antenna array response, and providing feedback to the antenna designer.

Figure 6:
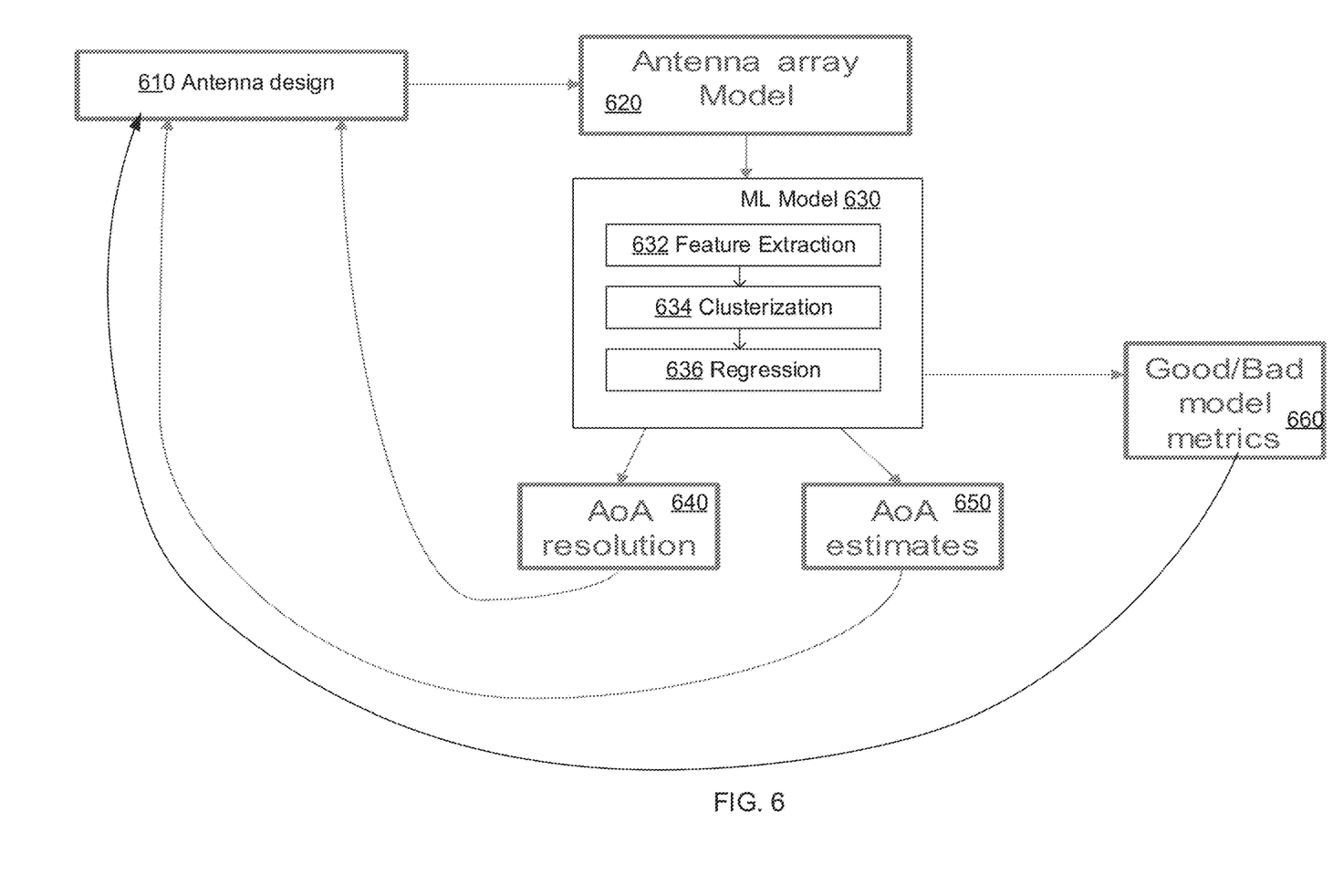
FIG. 6 schematically illustrates an example automated workflow for antenna design.

An example automated workflow for antenna design is depicted by FIG. 6. The workflow 600 may be initiated by the antenna design module 610 feeding the initial set of antenna design parameters 610 to the antenna array simulation model 620. In some implementations, the antenna design module 610 may be implemented by a computer-aided design (CAD) system, which may be fully automated and/or supervised by a human designer. The antenna design parameters may include the number, types, and geometric properties (e.g., shape, size, area) of antenna elements, as well as the size of spaces between the antenna elements.

The antenna array simulation model 620 produces the raw data utilized for estimating the angular resolution, which may include a plurality of RF signal magnitude and phase values measured by multiple antenna elements at one or more RF channels. Thus, each input data point is represented by a vector in a hyperspace of 2*N dimensions, where N is the number of antenna elements and the dimensions represent the magnitude and phase values measured by each antenna element. Notably, the antenna array model 620 is optional, and in some implementations physical measurements of the received RF signals by a physical antenna prototype may be performed instead.

The RF signal magnitude and phase values are then fed to the machine learning model 630, which performs the feature extraction operation 632 in order to reduce the dimensionality of the input data. The machine learning model 630 may then utilize the extracted features (i.e., representation of the input data in the reduced-dimension space) for performing the clustering operation 634 for grouping the data points into multiple clusters, such that each cluster would correspond to a certain value of the AoA. The machine learning model 630 may then perform the regression operation 636 to estimate the angular resolution 640 and/or AoA value 650, as described in more detail herein above.

The processing device implementing the workflow 600 may further identify, at block 660, one or more sub-optimal sections of the antenna array response and/or one or more satisfactory sections of the antenna array response. Sub-optimal sections of the antenna array response may include the sections that correspond to substantially overlapping, based on a chosen overlapping metric, clusters of features, which thus adversely affect the angular resolution. Satisfactory sections of the antenna array response may include the sections corresponding to non-intersecting or weakly overlapping clusters of features.

Figure 7:
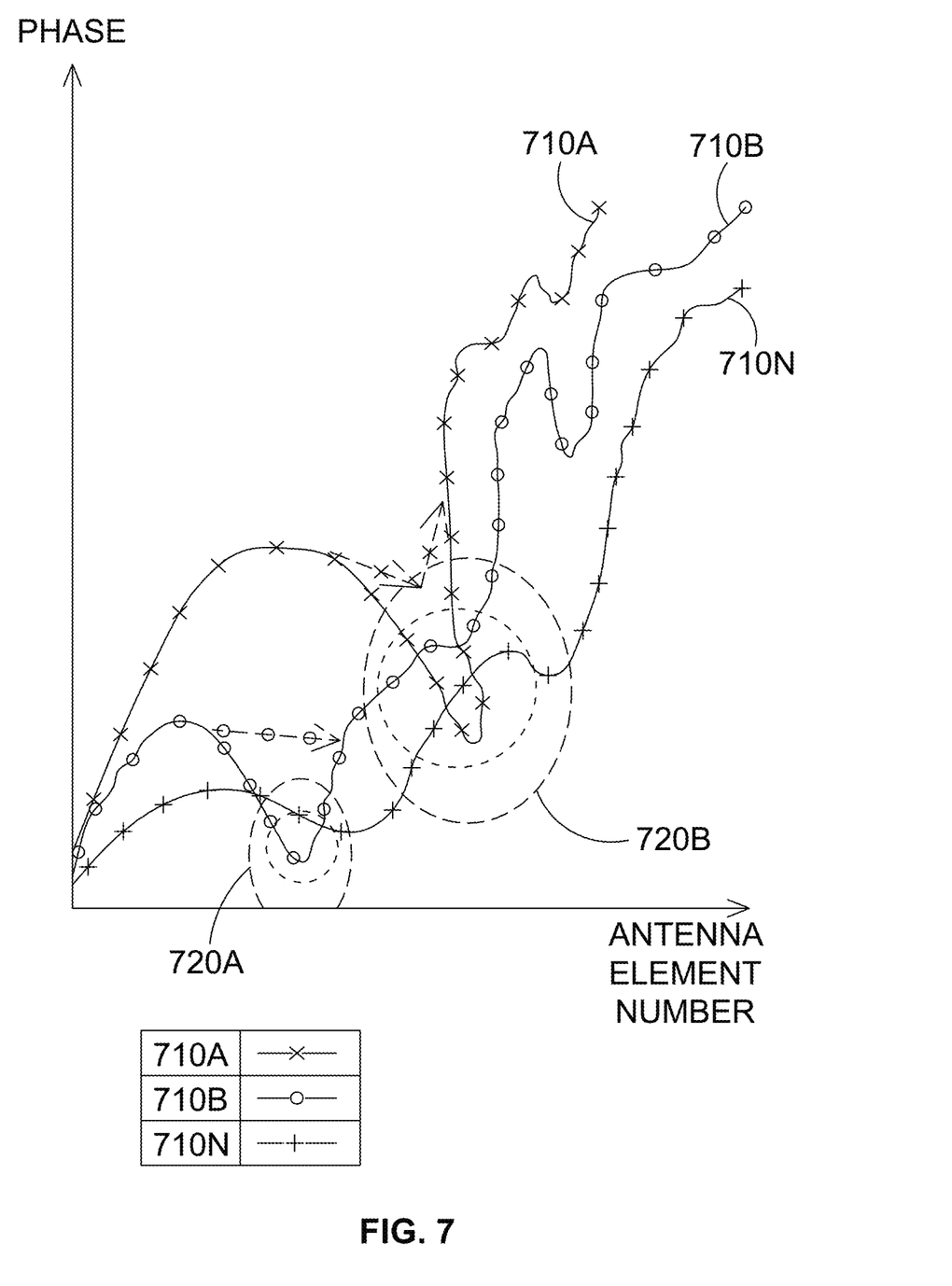
FIG. 7 illustrates the phase response of an example prototype antenna array.

FIG. 7 schematically illustrates the phase responses of an example prototype antenna. Each of the plots 710A, 710B, 710N corresponds to a certain AoA value of the received RF signal. As seen from FIG. 7, within the areas 720A and 720B, the phase responses may not be sufficiently distinguishable in order to provide the requisite angular resolution. Accordingly, referring again to FIG. 6, the processing device implementing the workflow 600 may further identify the antenna array elements corresponding to the identified sub-optimal and/or satisfactory sections of the antenna array response. The processing device may further identify design parameters (e.g., the size) of the antenna array elements that are likely to have caused the sub-optimal antenna response.

The output data including the angular resolution 640, the AoA value 650, and the identified sub-optimal and/or satisfactory sections 660 of the antenna array response may be fed back to the antenna design module 610, which may modify the values of one or more antenna design parameters and initiate a new iteration of the workflow 600 by feeding the modified antenna design parameters to the antenna model 620.

Figure 8:
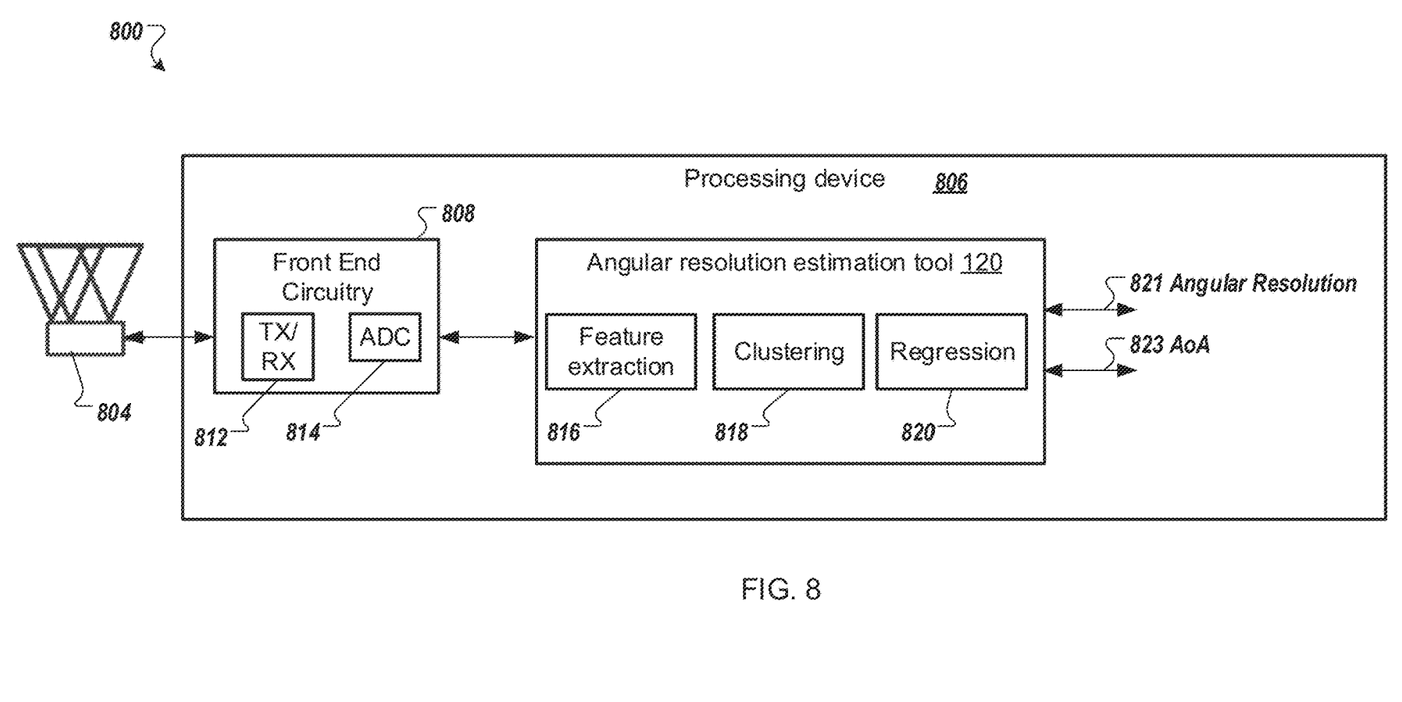
FIG. 8 is a block diagram of an example system for implementing the methods described herein.

FIG. 8 is a block diagram of a system that implements the methods described herein. The system 800 may include the processing device 806, which may optionally include a front-end circuitry 808 coupled to the antenna array 804. The front-end circuitry 808 may include a transceiver 812 and an analog-to-digital converter (ADC) 814. The transceiver 812 coupled to the antenna array 804 may transmit or receive RF signals via the antenna array 804. The processing device 806 may implement the angular resolution estimation tool 120, as described herein. The angular resolution estimation tool 120 may implement one or more machine learning models (such as neural network) for performing the feature extraction operation 816 for reducing the dimensionality of the input data, the clustering operation 818 for classifying the data points into several clusters corresponding to different AoA values, and the regression operation 820 for estimating the angular resolution and/or AoA values 812 and 823, as described in more detail herein above.

The processing device may include one or more application processors, one or more host processors, one or more microcontrollers, and/or other processing components. In some embodiments, the system 800 may be implemented as a System-on-Chip (SoC) including the transceiver and a processor to process digital values representing the RF signals received or transmitted by the transceiver. The transceiver and the processor may reside on a common carrier substrate or may be implemented in separate integrated circuits. Alternatively, the system 800 may be implemented as a mobile or wearable device (such as a smartphone or a smartwatch). Alternatively, the system 800 may be implemented as a desktop computer, a portable computer, or a server.

In some implementations, the processing device may receive a plurality of values of magnitude and phase of a radio frequency (RF) signal for each antenna element of a plurality of antenna elements comprised by an antenna array. The processing device 806 may then employ a machine learning model to perform a feature extraction operation to transform the plurality of values of magnitude and phase into a plurality of data points in a reduced-dimension space. The processing device 806 may then employ the machine learning model to classify the plurality of data points into a plurality of clusters. The processing device 806 may then compute, based on the plurality of clustered data points, an angular resolution value for the antenna array and/or AoA values for each cluster, as described in more detail herein above.

Figure 9:
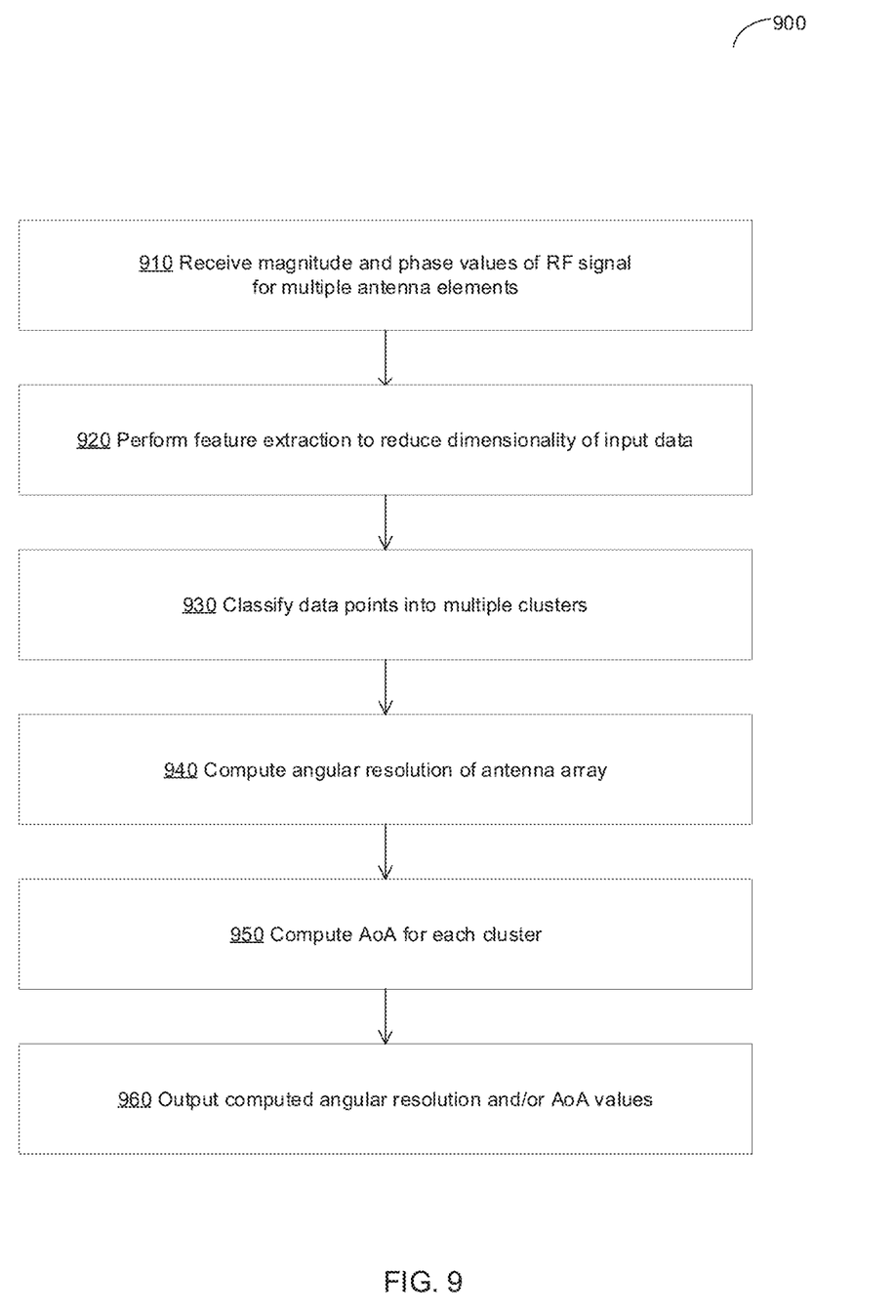
FIG. 9 is a flow diagram of an example method of estimating the angular resolution value of an antenna array.

FIG. 9 is a flow diagram of an example method of estimating the angular resolution value of an antenna array. The method 900 and/or each of its individual functions, routines, subroutines, or operations may be performed by processing logic comprising hardware (circuitry, dedicated logic, etc.), software (such as is run on a general purpose computing system or a dedicated machine), firmware (embedded software), or any combination thereof. Two or more functions, routines, subroutines, or operations of method 900 may be performed in parallel or in an order that may differ from the order described below. In certain implementations, method 900 may be performed by a single processing thread. Alternatively, method 900 may be performed by two or more processing threads, each thread executing one or more individual functions, routines, subroutines, or operations of the method. In an illustrative example, the processing threads implementing method 900 may be synchronized (e.g., using semaphores, critical sections, and/or other thread synchronization mechanisms). Alternatively, the processing threads implementing method 900 may be executed asynchronously with respect to each other. In one embodiment, the operations of methods 900 may be performed by the processing device 806 of the example system 800 of FIG. 8.

At block 910, the processing device implementing the method may receive a plurality of values of magnitude and phase of a radio frequency (RF) signal for each antenna element of a plurality of antenna elements comprised by an antenna array, as described in more detail herein above.

At block 920, the processing device may employ a machine learning model to perform a feature extraction operation in order to transform the plurality of values of magnitude and phase into a plurality of data points in a reduced-dimension space. In some implementations, the model employed for performing the feature extraction and clustering may be implemented by a neural network, such as a convolutional neural network (CNN), a recurrent neural network (RNN) or a multi-layer perceptron (MLP), as described in more detail herein above.

At block 930, the processing device may classify the plurality of data points into a plurality of clusters, as described in more detail herein above.

At block 940, the processing device may compute, based on the plurality of clustered data points, the angular resolution value of the antenna array. The angular resolution of the antenna array may be characterized by the cluster overlapping: relatively small or no overlap would indicate that the AoA values of the points belonging to neighboring clusters are distinguishable, and the angular resolution is at least the difference between the AoA values of the cluster centroids, while significant overlap would indicate that the angular resolution cannot be accurately estimated based on the available input data, as described in more detail herein above.

At block 950, the processing device may optionally perform a regression operation to infer, from the plurality of clustered data points, the AoA value for each cluster. In some implementations, the same model may be employed for performing the feature extraction, clustering, and regression operations of blocks 920, 930, and 950. Alternatively, multiple separate models may be employed for performing each of the tasks, as described in more detail herein above.

At block 960, the processing device may output (e.g., by displaying the computed values and/or transmitting the computed values to one or more recipients over one or more communication networks) the computed angular resolution value and/or AoA values, and the method may terminate.

Figure 10:
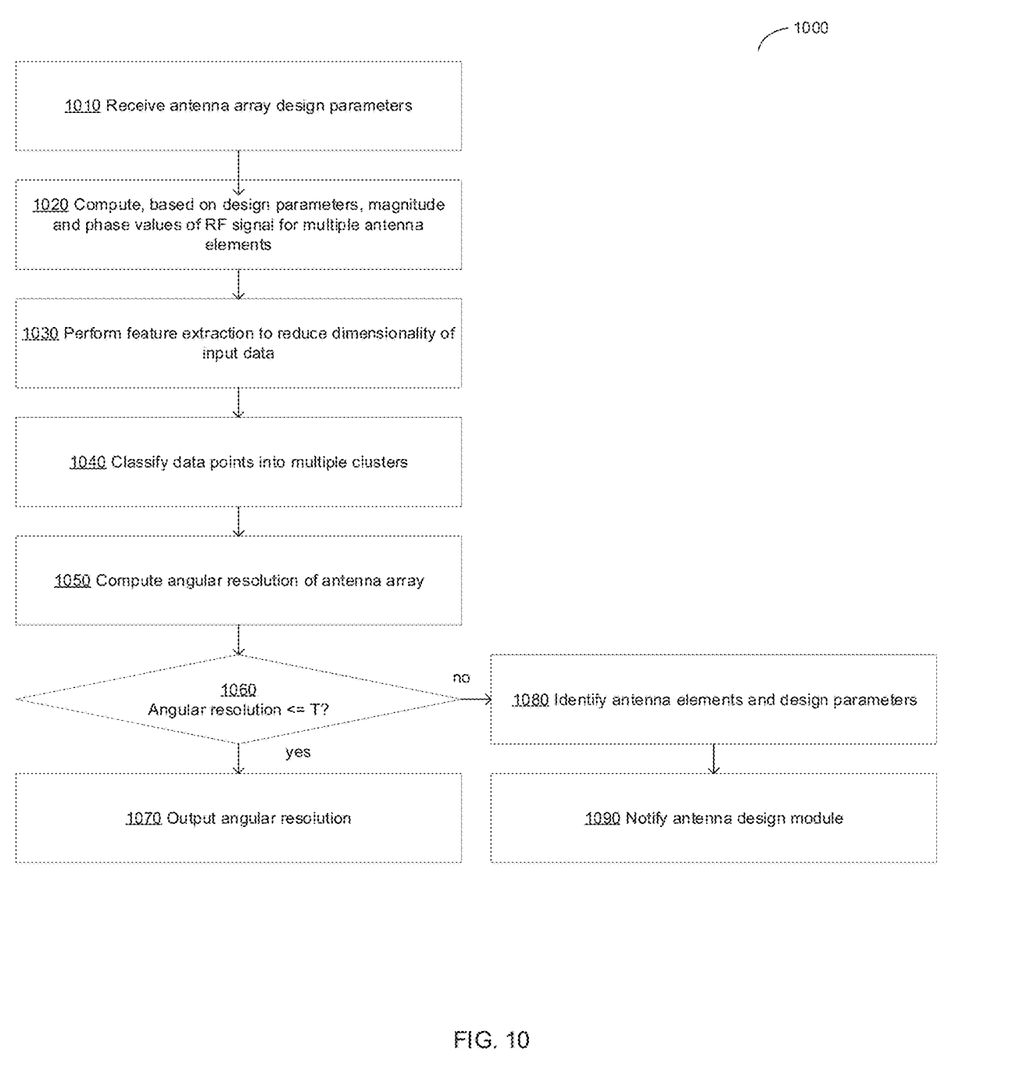
FIG. 10 is a flow diagram of an example method of automating antenna design workflow based on estimating the angular resolution value of an antenna array.

FIG. 10 is a flow diagram of an example method of automating antenna design workflow based on estimating the angular resolution value of an antenna array. The method 1000 and/or each of its individual functions, routines, subroutines, or operations may be performed by processing logic comprising hardware (circuitry, dedicated logic, etc.), software (such as is run on a general purpose computing system or a dedicated machine), firmware (embedded software), or any combination thereof. Two or more functions, routines, subroutines, or operations of method 1000 may be performed in parallel or in an order that may differ from the order described below. In certain implementations, method 1000 may be performed by a single processing thread. Alternatively, method 1000 may be performed by two or more processing threads, each thread executing one or more individual functions, routines, subroutines, or operations of the method. In an illustrative example, the processing threads implementing method 1000 may be synchronized (e.g., using semaphores, critical sections, and/or other thread synchronization mechanisms). Alternatively, the processing threads implementing method 1000 may be executed asynchronously with respect to each other. In one embodiment, the operations of methods 1000 may be performed by the processing device 806 of the example system 800 of FIG. 8.

At block 1010, the processing device implementing the method may receive a plurality of values of design parameters of an antenna array comprising a plurality of antenna elements. The antenna design parameters may include the number, types, and geometric properties (e.g., shape, size, area) of antenna elements, as well as the size of spaces between the antenna elements, as described in more detail herein above.

At block 1020, the processing device may apply an antenna simulation model in order to compute a plurality of values of magnitude and phase of the received RF signal by each antenna element of the antenna array characterized by the specified design parameters, as described in more detail herein above.

At block 1030, the processing device may employ a machine learning model to perform a feature extraction operation in order to transform the plurality of values of magnitude and phase into a plurality of data points in a reduced-dimension space. In some implementations, the model employed for performing the feature extraction and clustering may be implemented by a neural network, such as a convolutional neural network (CNN), a recurrent neural network (RNN) or a multi-layer perceptron (MLP), as described in more detail herein above.

At block 1040, the processing device may classify the plurality of data points into a plurality of clusters, as described in more detail herein above.

At block 1050, the processing device may employ the machine learning model for performing a regression operation to infer the angular resolution value of the antenna array from the plurality of clustered data points. The angular resolution of the antenna array may be characterized by the cluster overlapping: relatively small or no overlap would indicate that the AoA values of the points belonging to neighboring clusters are distinguishable, and the angular resolution is at least the difference between the AoA values of the cluster centroids, while significant overlap would indicate that the angular resolution cannot be accurately estimated based on the available input data. In some implementations, the same model may be employed for performing the feature extraction, clustering, and regression operations of blocks 1030, 1040, and 1050. Alternatively, multiple separate models may be employed for performing each of the tasks, as described in more detail herein above.

Responsive to determining, at block 1060, that the angular resolution value is less than or equal to a predetermined threshold value, the processing device may, at block 1070, output the computed angular resolution value of the antenna array (e.g., by displaying the computed angular resolution value and/or transmitting the computed angular resolution value to one or more recipients over one or more communication networks), and the method may terminate.

Otherwise, responsive to determining, at block 1060, that the angular resolution value exceeds the predetermined threshold value, the processing device may, at block 1080, identify an antenna array element and/or a design parameter of the antenna array that has caused the angular resolution value to exceed the predetermined threshold. In some implementations, the processing device may identify one or more sub-optimal sections of the antenna array response, as the sections in which the phase responses are not sufficiently distinguishable in order to provide the requisite angular resolution. The processing device may further identify the antenna array elements corresponding to the identified sub-optimal sections of the antenna array response. The processing device may further identify design parameters (e.g., the size) of the antenna array elements that are likely to have caused the sub-optimal antenna response as described in more detail herein above.

At block 1090, the processing device may notify (e.g., by displaying the notification and/or transmitting the notification to one or more recipients over one or more communication networks) the antenna design module of the computed angular resolution value and the antenna elements and/or antenna design parameters that may have adversely affected the angular resolution. Upon taking a remedial action (e.g., modifying the identified antenna design parameters), the antenna designer or antenna design CAD module may re-submit the modified antenna design parameters to the input block 1010 of the method 1000.

The embodiments described herein may be implemented by an electronic system including a processing device that may perform the same or similar functions as described with respect the above figures, and vice versa. In another embodiment, the processing device may be a microprocessor or a microcontroller. The angular resolution estimation tool 120 may be implemented as firmware executing on the microcontroller or microprocessor. The microcontroller may report the estimates described herein to an application processor. The electronic system may include a host processor for a computer system that utilizes the microcontroller to provide the estimates described herein. The host processor may include one or more processing devices, a memory, and other hardware or software components that perform operations for the electronic system.

The processing device may include analog and or digital general purpose input/output ("GPIO") ports. GPIO ports may be programmable. GPIO ports may be coupled to a Programmable Interconnect and Logic ("PIL"), which acts as an interconnect between GPIO ports and a digital block array of the processing device. The processing device may include analog blocks that may be programmed and reprogrammed in some cases to implement various analog functions. The processing device may also include a digital block array. The digital block array may be configurable to implement a variety of digital logic circuits (e.g., DACs, digital filters, or digital control systems) using, in one embodiment, configurable user modules ("UMs"). The digital block array may be coupled to a system bus. Processing device may also include a memory device, such as random access memory ("RAM") and program flash. RAM may be static RAM ("SRAM"), and program flash may be a non-volatile storage, which may be used to store firmware (e.g., control algorithms executable by a processor to implement operations described herein). Processing device may also include a memory controller unit ("MCU") coupled to memory and the processor. The processor may be a processing element (e.g., processor core) configured to execute instructions or perform operations. The processor may include other processing elements as would be appreciated by one of ordinary skill in the art having the benefit of this disclosure. It should also be noted that the memory may be internal to the processing device or external to it. In the case of the memory being internal, the memory may be coupled to a processing element, such as the processing core. In the case of the memory being external to the processing device, the processing device is coupled to the other device in which the memory resides as would be appreciated by one of ordinary skill in the art having the benefit of this disclosure.

In one embodiment, the processing device further includes processing logic. Some or all of the operations of the processing logic may be implemented in firmware, hardware, or software or some combination thereof. The processing logic may receive signals from the antenna array, as described herein. The processing device may also include an analog block array (e.g., field-programmable analog array). The analog block array may also be coupled to the system bus. Analog block array may also be configurable to implement a variety of analog circuits (e.g., ADCs or analog filters) using, in one embodiment, configurable UMs. The analog block array may also be coupled to the GPIO ports. The processing device may include internal oscillator/clocks and communication block ("COM"). In another embodiment, the processing device includes a spread-spectrum clock. The oscillator/clocks block provides clock signals to one or more of the components of processing device. Communication block may be used to communicate with an external component, such as a host processor (also referred to as an application processor), via application interface ("I/F") line.

The processing device may reside on a common carrier substrate such as, for example, an integrated circuit ("IC") die substrate, a multi-chip module substrate, or the like. Alternatively, the components of processing device may be one or more separate integrated circuits and or discrete components. In one exemplary embodiment, processing device is the Programmable System on a Chip (PSoC®) processing device, developed by Cypress Semiconductor Corporation, San Jose, Calif. Alternatively, processing device may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to an application processor, but may include a system that measures the RF signals and sends the raw data to a host computer where it is analyzed by an application. In effect, the processing that is done by processing device may also be done in the application processor.

The angular resolution estimation tool 120 may be integrated into the IC of the processing device, or alternatively, in a separate IC. Alternatively, descriptions of the angular resolution estimation tool 120 may be generated and compiled for incorporation into other integrated circuits. For example, behavioral level code describing parameters for the angular resolution estimation tool 120, or portions thereof, may be generated using a hardware descriptive language, such as VHDL or Verilog, and stored to a machine-accessible medium (e.g., CD-ROM, hard disk, floppy disk, etc.). Furthermore, the behavioral level code may be compiled into register transfer level ("RTL") code, a netlist, or even a circuit layout and stored to a machine-accessible medium. The behavioral level code, the RTL code, the netlist, and the circuit layout may represent various levels of abstraction to describe the angular resolution estimation tool 120. It should be noted that the components of electronic system may include all, some, or none of the components described above.

In one embodiment, the electronic system may be used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and or video) player, a handheld gaming device, a signature input device for point of sale transactions, an eBook reader, medical instruments, warehouse tracking devices, such as scanners used by shipping companies, automotive devices, such as car keys and electronic devices within a vehicle, global position system ("GPS") or a control panel. Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and or alternating manner. The terms "first," "second," "third," "fourth," etc. as used herein are meant as labels to distinguish among different elements and may not necessarily have an ordinal meaning according to their numerical designation. As used herein, the term "coupled" may mean connected directly or indirectly through one or more intervening components. Any of the signals provided over various buses described herein may be time multiplexed with other signals and provided over one or more common on-die buses. Additionally, the interconnection and interfaces between circuit components or blocks may be shown as buses or as single signal lines. Each of the buses may alternatively be one or more single signal lines and each of the single signal lines may alternatively be buses.

The above description sets forth numerous specific details such as examples of specific systems, components, methods, and so forth, in order to provide an understanding of several embodiments of the present invention. It may be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth are merely exemplary. Particular implementations may vary from these exemplary details and still be contemplated to be within the scope of the present embodiments.

Embodiments of the claimed subject matter include, but are not limited to, various operations described herein. These operations may be performed by hardware components, software, firmware, or a combination thereof.

The above description sets forth numerous specific details such as examples of specific systems, components, methods, and so forth, in order to provide an understanding of several embodiments of the claimed subject matter. It may be apparent to one skilled in the art, however, that at least some embodiments of the disclosure may be practiced without these specific details. In other instances, well-known components or methods are not described in detail or are presented in simple block diagram format. Thus, the specific details set forth are merely exemplary. Particular implementations may vary from these exemplary details and still be contemplated to be within the scope of the claimed subject matter.

What is claimed is:

1. A method, comprising:
receiving, by one or more processors, a plurality of data points indicative of magnitude and phase of a radio frequency (RF) signal for each antenna element of a plurality of antenna elements comprised by an antenna array;
clustering, by the one or more processors, the plurality of data points into a plurality of clusters;
computing, by the one or more processors, an angular resolution value of the antenna array based on a comparison between a first value corresponding to a first cluster of the plurality of clusters and a second value corresponding to a second cluster of the plurality of clusters; and
outputting, by the one or more processors, the angular resolution value.

2. The method of claim 1, further comprising:
performing, by the one or more processors applying a machine learning model, a feature extraction operation with the plurality of data points, wherein the feature extraction operation reduces a dimensionality of one or more of the data points of the plurality of data points.

3. The method of claim 1, further comprising:
clustering, by the one or more processors, the plurality of data points into the plurality of clusters using a k-means clustering technique.

4. The method of claim 1, further comprising:
determining, by the one or more processors, that the angular resolution value exceeds a predetermined threshold; and
identifying, by the one or more processors, a design parameter of the antenna array that has caused the angular resolution value to exceed the predetermined threshold.

5. The method of claim 1, wherein the plurality of data points of the antenna array are clustered without being adjusted by relative signal modifications between individual antenna elements of the antenna array corresponding to an antenna gain distribution.

6. The method of claim 1, further comprising:
determining, by the one or more processors, that the angular resolution value exceeds a predetermined amount;
determining, by the one or more processors, based on the angular resolution value exceeding the predetermined amount, a modification of a first design parameter corresponding to the antenna array;
computing, by the one or more processors, a second angular resolution value corresponding to the modification of the first design parameter.

7. The method of claim 1, further comprising:
computing, by the one or more processors for each cluster of the plurality of clusters, a corresponding value of an angle-of-arrival (AoA), wherein the first value corresponds to an AoA value associated with the first cluster and the second value corresponds to an AoA value associated with the second cluster.

8. A device, comprising:
a memory; and
one or more processors, coupled to the memory, to:
receive a plurality of data points indicative of magnitude and phase of a radio frequency (RF) signal for each antenna element of a plurality of antenna elements comprised by an antenna array;
cluster the plurality of data points into a plurality of clusters;
compute an angular resolution value of the antenna array based on a comparison between a first value corresponding to a first cluster of the plurality of clusters and a second value corresponding to a second cluster of the plurality of clusters; and
output the angular resolution value.

9. The device of claim 8, wherein the one or more processors are further to:
perform, by applying a machine learning model, a feature extraction operation with the plurality of data points, wherein the feature extraction operation reduces a dimensionality of one or more of the data points of the plurality of data points.

10. The device of claim 8, wherein the one or more processors are further to:
cluster the plurality of data points into the plurality of clusters using a k-means clustering technique.

11. The device of claim 8, wherein the one or more processors are further to:
determine that the angular resolution value exceeds a predetermined threshold; and
identify a design parameter of the antenna array that has caused the angular resolution value to exceed the predetermined threshold.

12. The device of claim 8, wherein the plurality of data points of the antenna array are clustered without being adjusted by relative signal modifications between individual antenna elements of the antenna array corresponding to an antenna gain distribution.

13. The device of claim 8, wherein the one or more processors are further to:
determine that the angular resolution value exceeds a predetermined amount;
determine, based on the angular resolution value exceeding the predetermined amount, a modification of a first design parameter corresponding to the antenna array; and
compute a second angular resolution value corresponding to the modification of the first design parameter.

14. The device of claim 8, further comprising:
compute, for each cluster of the plurality of clusters, a corresponding value of an angle-of-arrival (AoA), wherein the first value corresponds to an AoA value associated with the first cluster and the second value corresponds to an AoA value associated with the second cluster.

15. A non-transitory computer-readable storage medium comprising instructions that, when executed by one or more processors, cause the one or more processors to perform operations comprising:
receiving a plurality of data points indicative of magnitude and phase of a radio frequency (RF) signal for each antenna element of a plurality of antenna elements comprised by an antenna array;
clustering the plurality of data points into a plurality of clusters;
computing an angular resolution value of the antenna array based on a comparison between a first value corresponding to a first cluster of the plurality of clusters and a second value corresponding to a second cluster of the plurality of clusters; and
outputting the angular resolution value.

16. The non-transitory computer-readable storage medium of claim 15, wherein the instructions further cause the one or more processors to perform operations comprising:
performing, by applying a machine learning model, a feature extraction operation with the plurality of data points, wherein the feature extraction operation reduces a dimensionality of one or more of the data points of the plurality of data points.

17. The non-transitory computer-readable storage medium of claim 15, wherein the instructions further cause the one or more processors to perform operations comprising:
clustering the plurality of data points into the plurality of clusters using a k-means clustering technique.

18. The non-transitory computer-readable storage medium of claim 15, wherein the instructions further cause the one or more processors to perform operations comprising:
determining that the angular resolution value exceeds a predetermined threshold; and
identifying a design parameter of the antenna array that has caused the angular resolution value to exceed the predetermined threshold.

19. The non-transitory computer-readable storage medium of claim 15, wherein the instructions further cause the one or more processors to perform operations comprising:
- determining that the angular resolution value exceeds a predetermined amount;
- determining, based on the angular resolution value exceeding the predetermined amount, a modification of a first design parameter corresponding to the antenna array; and
- computing a second angular resolution value corresponding to the modification of the first design parameter.

20. The non-transitory computer-readable storage medium of claim 15, further comprising:
- computing, for each cluster of the plurality of clusters, a corresponding value of an angle-of-arrival (AoA), wherein the first value corresponds to an AoA value associated with the first cluster and the second value corresponds to an AoA value associated with the second cluster.

* * * * *